United States Patent Office 3,790,675
Patented Feb. 5, 1974

3,790,675
CERTAIN INDOLOBENZAZEPINE DERIVATIVES AS ANALGESICS
Harold Blumberg, Flushing, N.Y., assignor to Endo Laboratories, Inc., Garden City, N.Y.
No Drawing. Filed Apr. 19, 1972, Ser. No. 245,300
Int. Cl. A61k 27/00
U.S. Cl. 424—263
13 Claims

ABSTRACT OF THE DISCLOSURE 1,2,3,4,8,9 - hexahydropyrido[4',3':2,3]indolo[1,7-ab] [1]benzazepine and certain 3-substituted derivatives thereof are useful analgesics, which can be administered orally to warm-blooded animals. In addition to the free bases, their salts with pharmaceutically acceptable organic or inorganic acids can be used.

BACKGROUND OF THE INVENTION

This invention relates to the use of certain indolobenzazepine derivatives, namely, of 1,2,3,4,8,9-hexahydropyrido[4',3':2,3]indolo[1,7-ab][1]benzazepine and of certain 3-substituted derivatives thereof as analgesics.

U.S. Pats. 3,373,153, 3,373,168, and 3,457,271 (to Cohen et al.) disclose a class of organic compounds of the generic Formula (1)

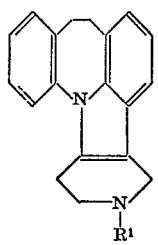

(1)

where $R^1$ is a straight or branched-chain alkyl having 1–7 carbon atoms.

These compounds are said to have utility as intermediates in the preparation of compounds which have antidepressant activity.

British Pat. 1,149,507 (to Roche Products Limited) discloses a group of iminodibenzyl derivatives of Formula (2), which possess a "marked depressant activity on the central nervous system and are useful as sedatives and tranquilizers."

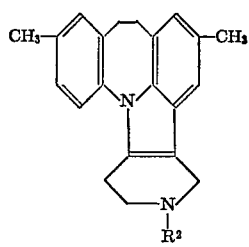

(2)

where $R^2$ is hydrogen or a straight chain alkyl group of no more than 4 carbon atoms.

The copending application of Michael Finizio, Ser. No. 170,990, filed Aug. 11, 1971, described a class of compounds having the following Formula (3)

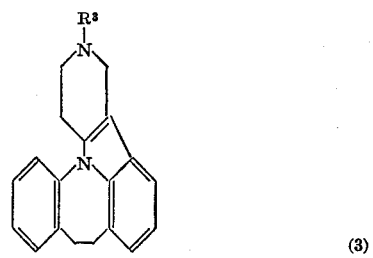

(3)

where $R^3$ is represented by the formula $C_n(H_{2n-x})Z_y$, where Z is oxygen or sulfur; $n$ is a positive integer of 3–12; $x$ is 1, 3 or 5; and $y$ is 0 or 1; with the proviso that when $w$ is 1, $n$ is no larger than 6, and $x$ is 1; and when $x$ is 5, $n$ is at least 7.

These compounds and their salts produce in warm-blooded animals either anxiolytic and/or antipsychotic effects.

None of the above-mentioned previously reported compounds has been heretofore suggested for use as analgesic.

SUMMARY OF THE INVENTION

According to this invention, it has now been discovered that certain derivatives of hexahydropyridoindolobenzazepine are good analgesics. These compounds can be represented by the general Formula (4), below:

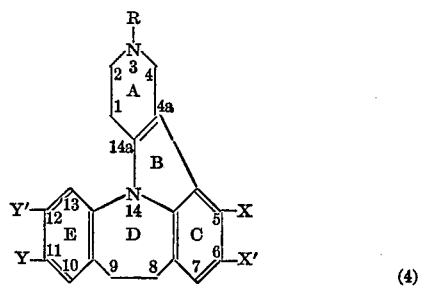

(4)

wherein rings E and D form the benzazepine portion of the molecule; rings B and C form the indolo portion; and ring A forms the pyrido portion.

In the above formula,

R is hydrogen; a $C_1$–$C_{12}$ aliphatic hydrocarbon radical; benzyl; a $C_nH_{(2n-1)}Z$ group, wherein $n$ is a positive integer of 3–6; a

group;

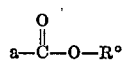

group;
or

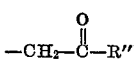

group; wherein
Z is oxygen or sulfur; R' is a $C_2$–$C_{11}$ hydrocarbon radical, a $C_mH_{(2m-1)}Z$ group wherein $m$ is a positive integer of 2–5, or an —$NR_1R_2$ group wherein each of $R_1$ and $R_2$ independently is hydrogen or a $C_1$–$C_4$ alkyl;
R° is a $C_1$–$C_4$ alkyl; R" is a $C_1$–$C_4$ alkyl; and
X, X', Y and Y' individually are hydrogen, fluorine, chlorine, bromine, trifluoromethyl, a $C_1$–$C_4$ alkyl, or a $C_1$–$C_4$ alkoxyl; provided that one of X and X' and one of Y and Y' must be hydrogen.

The term "aliphatic," as used herein, comprises saturated and unsaturated, linear and branched, and cyclic hydrocarbon radicals, as well as radicals which may be linear or branched in part and cyclic in part. The term "unsaturated" means both monounsaturated and polyunsaturated and includes both olefinic and acetylenic unsaturation. The term "cyclic" means monocyclic as well as bicyclic and tricyclic.

Salts of the above bases with pharmaceutically acceptable organic or inorganic acids can be prepared and used with the same effect.

DETAILED DESCRIPTION OF THE INVENTION

The analgesic compounds of the present invention are named according to the IUPAC 1957 Rules as 3-substituted derivatives of 1,2,3,4,8,9-hexahydropyrido[4',3':2,3]indolo[1,7-ab][1]benzazepine, the numbering system being indicated in the above Formula (4).

Most compounds of the above Formula (4) can be made by the process disclosed in U.S. Pat. 3,457,271 (to Cohen et al.) involving the condensation of N-aminoiminodibenzyl hydrochloride with appropriate N-alkyl-4-piperidone, followed by the cyclization of the condensation product in acid medium.

Alternative processes for making the compounds of Formula (4) are disclosed in the copending application Ser. No. 245,301 of Joel G. Berger and Sonia Teller, filed concurrently herewith. These processes include a two-step reaction of N-nitrosoiminodibenzyl with 4-piperidone or an appropriately N-substituted 4-piperidone in the presence of metallic zinc and acetic acid in a reduction resistant solvent; the hydrazone obtained in this first step is then cyclized to the desired compound of Formula (4) by treatment with a strong acid. Other alternative processes for preparing compounds of Formula (4) also are disclosed in the above-cited copending application Ser. No. 245,301 of Joel G. Berger and Sonia Teller.

Representative R groups include, for example, the following: cycloalkyl, (alkylcycloalkyl), (cycloalkyl)alkyl, (alkylcycloalkyl)alkyl, straight chain or branched alkenyl, alkadienyl or alkynyl, (cycloalkenyl)alkyl, (cycloalkadienyl)alkyl, (oxacycloalkyl)alkyl, (thiacycloalkyl)alkyl, (bicycloalkyl)alkyl, (bicycloalkenyl)alkyl, or (tricycloalkyl)alkyl. Specific R groups include, for example, the following: allyl, 2-methylallyl, 1-ethylallyl, 3-methyl-2-butenyl, cis- and trans-2-butenyl, cis- and trans-3-methyl-2-pentenyl, 2,3-dimethyl-2-butenyl, 3-hexenyl, and 2-decenyl; cyclopropylmethyl, (1-methylcyclopropyl)methyl, (cis- and trans-2-methylcyclopropyl)methyl, (cis,cis-, trans-cis- and trans-trans-2,3-dimethylcyclopropyl)methyl, 1-cyclopropylethyl, 1-cyclopropylbutyl, cyclobutylmethyl, cyclopentylmethyl, cyclohexylmethyl, 1-cyclohexylethyl and cycloheptylmethyl; 2,3-epoxypropyl, (cis- and trans-2,3-epoxybutyl), tetrahydrofurfuryl, (tetrahydropyranyl)methyl, 1 - (tetrahydropyranyl)ethyl, 2,3 - thioepoxypropyl, tetrahydrothenyl, and (tetrahydrothiopyranyl)methyl; 2-propynyl, 1-methyl-2-propynyl and 1-ethyl-2-butynyl; (2,3-dimethylcyclopropenyl)methyl, (2- and 3-cyclopentenyl)methyl, and (1-, 2- and 3-cyclohexenyl) methyl; norbornylmethyl, norcarylmethyl, and (bicyclo-[2.2.2]octyl)methyl; cis- and trans-2,4-pentadienyl, and cis,cis-, cis,trans-, trans,cis- and trans,trans-2,4-hexadienyl; (2,5 - cyclohexadienyl)methyl, (cycloheptadienyl) methyl, (bicyclo[2.2.1]heptenyl)methyl, (bicyclo[2.2.1] octenyl)methyl, 1- and 2-adamantylmethyl, benzyl, propionyl, isobutyroyl, acetonyl, N-ethylcarbamoyl, N-methylcarbamoyl, N,N-dimethylcarbamoyl, cyclopropylcarbonyl, 2-oxo-1-butyl, and ethoxycarbonyl.

Additional salts of the free bases of Formula (4) with organic or inorganic acids are normally more water-soluble than the bases themselves. Representative pharmaceutically acceptable acids which can be useful for this purpose include the following: hydrochloric, hydrobromic, sulfuric, sulfamic, phosphoric, nitric, maleic, fumaric, benzoic, ascorbic, citric, pamoic, succinic, methanesulfonic, ethanedisulfonic, acetic, oxalic, propionic, tartaric, salicylic, gluconic, lactic, malic, mandelic, cinnamic, citraconic, aspartic, stearic, palmitic, itaconic, glycolic, p-aminobenzoic, glutamic, and toluenesulfonic.

The preparation of representative compounds within the scope of this invention is described in the following examples, in which all parts, proportions, and percentages are per weight unless otherwise indicated. The symbol TLC refers to analysis by thin layer chromatography, in which glass plates coated with a 0.25 mm. layer of silica gel containing fluorescent indicator F-254 (manufactured by E. Merck AG, Darmstadt) are used. The symbol is followed in parentheses by the solvents and the proportions, by volume, in which they are used as the developing agents.

EXAMPLE 1

1,2,3,4,8,9 - hexahydropyrido[4',3':2,3]indolo[1,7-ab][1] benzazepine (R=H; X=X'=Y=Y'=H)

Method I.—To a mixture of 4.5 g. of N-nitrosoiminodibenzyl (10,11 - dihydro - 5-nitroso-5H-dibenz[b,f]azepine), 6.0 g. of 4-piperidone hydrochloride and 6.5 g. of zinc dust in 30 ml. of absolute ethanol 12 ml. of glacial acetic acid are added dropwise, with constant stirring. Occasional cooling in an ice-bath is required to maintain the temperature at 20–25° during the course of the reaction. After four hours, the unchanged zinc is filtered off, washed with a minimum of absolute ethanol, and to the combined filtrate and wash there is added with stirring 8 ml. of concentrated sulfuric acid in 50 ml. of absolute ethanol. Stirring is continued while the mixture is warmed for about ten minutes, until the alcohol begins to reflux. It is then cooled down again; the inorganic insolubles are filtered off, and approximately 500 ml. of water is added to the filtrate, resulting in a voluminous white precipitate. The whole mixture is extracted with ether, and the residual aqueous phase is warmed up to transform the precipitate into granular solids, which are then filtered off and redissolved in approximately 600 ml. aqueous acetic acid. Some warming is required to completely dissolve all material. On treating this solution with 3 N aqueous ammonia, the title compound (I) is obtained as a tan-white granular solid M.P. 134–137°.

To a solution of 2.7 g. of (I) in 150 ml. acetone is added a solution of 960 mg. methanesulfonic acid in 20 ml. of acetone; the resulting solution is diluted with approximately 25 ml. of n-pentane and allowed to stand at −20°. The solid which forms is recrystallized from 4:1 acetone-isopropanol, to yield an off-white 1,2,3,4,8,9-hexahydropyrido[4',3':2,3]indolo[1,7 - ab][1]benzazepine mesylate (II), which, after drying at 138° and 0.05 mm. pressure for 20 hours melts at 194.5–197°. This salt is soluble in water to the extent of more than 10 weight percent.

Method II.—A mixture of 24.6 g. of N-aminoiminodibenzyl (5-amino - 10,11 - dihydro-5H-dibenz[b,f]azepine) and 14.8 g. of 4-piperidone hydrochloride in 250 ml. ethanol is heated on a steam bath for 15 minutes and cooled; a solution of 20 g. of concentrated sulfuric acid in 250 ml. ethanol is added. The resulting mixture is reheated on the steam bath for an additional 40 minutes; the solution which forms is cooled, basified with ammonia, and diluted with 1 l. of water. The crude, semisolid base which separates is taken up in ether, and the aqueous mother liquors are extracted with additional portions of ether. The combined ethereal extracts are concentrated to 500 ml., and treated, under an atmosphere of nitrogen and with vigorous stirring, with 50 ml. of 5 N hydrochloric acid. The resulting precipitate is filtered off, washed with ether and 1 N hydrochloric acid, and dried in vacuo at 100° to yield 1,2,3,4,8,9-hexahydropyrido-

[4′,3′:2,3]indolo[1,7 - ab][1]benzazepine hydrochloride (III), M.P. 309°, a salt only very slightly soluble in water. Dissolving (III) in aqueous acetic acid, basifying with ammonia, filtering off the crude product and recrystallizing it from benzene regenerates the free base in the form of a solvate which by TLC (8% diethylamine in benzene) is identical with the free base of Method I.

EXAMPLE 2

3-acetyl-1,2,3,4,8,9-hexahydropyrido[4′,3′:2,3]indolo[1,7-ab][1]benzazepine

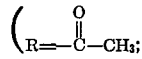

X=X′=Y=Y′=H)

To a mixture of 9.0 g. of N-nitrosoiminodibenzyl, 12.4 g. of 1-acetyl-4-piperidone and 13.0 g. zinc dust in 75 ml. absolute ethanol there is added dropwise 24 ml. of glacial acetic acid with constant stirring and occasional cooling to keep the reaction temperature at 20–25° C. After six hours, the unchanged zinc is filtered off and the mother liquor evaporated to near dryness. After extracting the residues with benzene, the extract is washed with saturated sodium chloride solution, dried over magnesium sulfate, and the solvent stripped off. The yellowish-brown residue is dissolved in 50 ml. ethanol, treated with a solution of 8 ml. concentrated sulfuric acid in 50 ml. ethanol, and heated on a steam bath for about ten minutes. On pouring into cold water, a gum separates, from which the aqueous layer can be decanted. After dissolving the gum in ethyl acetate, the solution is washed with saturated sodium chloride solution and dried over sodium sulfate. Evaporation of the solvent gives a yellowish-white solid, which on crystallization from acetone yields the title compound (IV) as a white solid, M.P. 193–196°.

One gram of (IV) is refluxed in a solution of 2.5 g. potassium hydroxide in 50 ml. methanol and 5 ml. water for 30 hours; the solution is poured into water and extracted with ether. The ethereal extract is washed with saturated sodium chloride until neutral, dried over sodium sulfate, and stripped down to dryness. The residual yellow oil is once again dissolved in ether, and 5N hydrochloric acid is added with vigorous stirring. The salt which precipitates is filtered and dried to give a solid, M.P. 297–300°, identical with (III) by TLC (8% diethylamine/benzene).

EXAMPLE 3

1,2,3,4,8,9-hexahydropyrido[4′,3′:2,3]indolo[1,7-ab][1]benzazepine-3-carboxylic acid ethyl ester (R=—COOC₂H₅; X=X′=Y=Y′=H)

Method I.—Following the procedure outlined for the preparation of (IV), but using instead of 1-acetyl-4-piperidone an equivalent amount of 4-oxo-1-piperidinecarboxylic acid ethyl ester, a crude product is obtained, which is purified by chromatography on a neutral alumina column eluated with benzene. On recrystallization from ether-petroleum ether (B.P. 30–60°), the title compound (V), M.P. 120–125°, is obtained.

A mixture of 10 g. of this ester (V) and of 16 g. of sodium hydroxide in a solution of 320 ml. ethanol and 20 ml. water in 260 ml. dimethyl sulfoxide is heated at 100° for three hours, and then allowed to remain at room temperature overnight. After partitioning between water and ether, the combined ether extracts are dried and evaporated to dryness. The residue is treated with 5 N hydrochloric acid to form a solid which is filtered and washed with ether to give a product melting at 307°, which is identical with (III) by TLC (chloroform-isopropanol-diethylamine-7:3:0.2).

Method II.—Reaction of (I) with ethyl chloroformate in dichloromethane containing an equivalent amount of triethylamine gives a product identical with (V) by TLC (8% diethylamine/benzene).

EXAMPLE 4

3 - isobutyl - 1,2,3,4,8,9 - hexahydropyrido[4′,3′:2,3]indolo[1,7 - ab][1]benzazepine hydrochloride (salt of Formula 4; R=isobutyl; X=X′=Y=Y′=H)

To a solution of 5.5 g. of (I) in 150 ml. of dichloromethane containing 25 ml. of triethylamine a solution of 4.2 ml. of isobutyryl chloride in approximately 25 ml. of dichloromethane is added dropwise, with constant stirring. On heating to reflux, the white precipitate originally formed redissolves. Refluxing is continued for two hours; the solution is cooled, washed with water and with saturated sodium bicarbonate, dried over anhydrous potassium carbonate, and stripped down to a dark gum, which is taken up in hexane, boiled and decolorized. After concentrating the clear solution to 100 ml. and cooling, a gum separates which solidifies completely on standing. After one week, 3-isobutyryl-1,2,3,4,8,9-hexahydropyrido[4′,3′:2,3]indolo[1,7-ab][1]benzazepine (VI) (R=isobutyryl; X=X′=Y=Y′=H), M.P. 122–124°, is isolated.

A solution of 3.3 g. of (VI) in 50 ml. of tetrahydrofuran is added to a stirred suspension of 1.5 g. of lithium aluminum hydride in 100 ml. of tetrahydrofuran, and the mixture is refluxed for four hours with continued stirring. It is then cooled and hydrolyzed with 1 N sodium hydroxide, and the aluminum salts are filtered off. The mother liquor is evaporated under reduced pressure, the resulting residue dissolved in ether, and the ether is removed in vacuo after drying. The residual oil is dissolved in a 1:1 mixture of ethyl acetate-benzene and chromatographed on a 14 x 2.2 cm. column of neutral alumina, activity I. The first 150 ml. fraction of eluate, which contains only a single substance as shown by thin layer chromatography, is taken down to dryness; the residual colorless oil is dissolved in ether, and a solid, somewhat gummy salt is precipitated by addition of an excess of ethereal hydrogen chloride. On trituration of the salt with acetone, the title compound (VII) (R=isobutyl; X=X′=Y=Y′=H) is obtained as a fine, white solid, M.P. 237–240°.

EXAMPLE 5

1,2,3,4,8,9 - hexahydro - 3 - methylpyrido[4′,3′:2,3]indolo[1,7-ab][1]benzazepine hydrochloride (salt of Formula 4; R=CH₃; X=X′=Y=Y′=H)

Following the procedure of Example 2, but using instead of 1-acetyl-4-piperidone an equivalent amount of 1-methyl-4-piperidone, the title compound (VIII) is obtained as an off-white solid, M.P. 259°.

EXAMPLE 6

3 - ethyl - 1,2,3,4,8,9 - hexahydropyrido[4′,3′:2,3]indolo[1,7 - b][1]benzazepine hydrochloride (salt of Formula 4; R=C₂H₅; X=X′=Y=Y′=H)

By a procedure similar to the reduction of (VI) to (VII), the 3-acetyl compound (IV) is reduced with lithium aluminum hydride in tetrahydrofuran to the title compound (IX), M.P. 270°, identical with authentic material by TLC (chloroform-isopropanol-diethylamine-7:3:0.2).

EXAMPLE 7

3 - (cyclopropylmethyl) - 1,2,3,4,8,9 - hexahydropyrido[4′,3′:2,3]indole[1,7-ab][1]benzazepine (R=cyclopropylmethyl; X=X′=Y=Y′=H)

Method I.—A solution of 10.4 g. of cyclopropanecarbonyl chloride in 50 ml. of dichloromethane is rapidly added to a solution of 12.5 g. of 4-piperidone ethylene acetal (1,4-dioxa-8-azaspiro[4.5]decane) and 20 g. of triethylamine in 200 ml. of dichloromethane, causing the solution to reflux. Heating to reflux with stirring is continued overnight; the mixture is cooled and the precipitated triethylammonium chloride filtered off. The mother liquor is concentrated to about half volume, washed with water, dried over anhydrous potassium carbonate, and stripped to dryness. The residual oil quickly solidifies, and on crystallization from 300 ml. hexane yields 8-(cyclopropylcarbonyl)-1,4-dioxa-8 - azaspiro[4.5]decane, M.P. 72–74°, as white needles. Reduction of 14.0 g. of this compound in 60 ml. freshly chromatographed, peroxide-free ether by dropwise addition to a suspension of 2.5 g. of lithium aluminum hydride in similarly treated ether, followed by three hours of refluxing, yields 8 - (cyclopropylmethyl) - 1,4 - dioxa - 8 - azaspiro[4.5]decane as a colorless oil. Hydrolysis of this ethylene acetal by refluxing in 2 N hydrochloric acid, followed by basification with 50% sodium hydroxide, extraction into ether, drying of the extraction into ether, drying of the extract, and stripping off the solvent, yields a crude product which distills at 111–122°/16 mm. to give 1-(cyclopropylmethyl)-4-piperidone (X), shown by gas-liquid chromatography to be 95–99% pure.

To a suspension of 3.8 g. of N-nitrosoiminodibenzyl and 5 g. of zinc dust in 30 ml. absolute alcohol, 5.7 g. of this piperidone (X) is added, followed by 10.2 ml. glacial acetic acid, added dropwise with stirring and occasional cooling to maintain a temperature of 20–25° C. After eight hours, the unchanged zinc is filtered off and the mother liquor evaporated nearly to dryness. The residue is extracted with benzene; the extract is washed with a saturated sodium chloride solution, dried over magnesium sulfate, and evaporated. The residue is dissolved in 50 ml. of ethanol, treated with a solution of 8 ml. of concentrated sulfuric acid in 50 ml. of ethanol, and heated on a steam bath for about ten minutes. The solution is poured into cold water, made basic with concentrated sodium hydroxide, and extracted with ether. The ether extract yields on evaporation 3 - (cyclopropylmethyl) - 1,2,3,4,8,9-hexahydropyrido[4',3':2,3]indolo[1,7 - ab] [1] benzazepine, which is recrystallized from 6:1 acetone-water by volume, or from n-heptane, to give the pure title compound (XI) M.P. 94–96°.

On addition of a solution of 10.5 g. of methanesulfonic acid in 20 ml. of acetone to a solution of 36 g. of (XI) in 200 ml. acetone, an exothermic reaction occurs, from which the salt separates while the reaction mixture is still hot. Further recrystallization of this salt from 1:1 hexane-isopropanol yields 3 - (cyclopropylmethyl) - 1,2,3,4,8,9-hexahydropyrido[4',3':2,3]indolo[1,7 - ab][ 1 ]benzazepine methanesulfonate (XII) M.P. 220–221°, a crystalline, white solid which is soluble in water to the extent of more than 50 weight percent.

Method II.—To a solution of 16.4 g. of (I) in 500 ml. of dichloromethane, 7.3 g. of cyclopropanecarbonyl chloride is added, followed by dropwise addition of 10 ml. of triethylamine. A mildly exothermic reaction takes place, after which stirring of the mixture is continued at room temperature overnight. The mixture is then washed with 1 N hydrochloric acid and water, and dried over anhydrous sodium carbonate. On evaporation to dryness, crude 3 - (cyclopropylcarbonyl) - 1,2,3,4,8,9 - hexahydropyrido-[4',3':2,3]indolo[1,7 - ab][1]benzazepine (Formula 4, R=cyclopropylcarbonyl; X=X'=Y=Y'=H) is obtained as a glassy product. Recrystallization from ethanol yields the pure compound (XIII), M.P. 154–156°.

A solution of 8.6 g. of (XIII) is 120 ml. of tetrahydrofuran is added dropwise to a suspension of 2.3 g. of lithium aluminum hydride in 180 ml. of tetrahydrofuran. On completion of the addition, the mixture is first refluxed for four hours, then allowed to stir at room temperature overnight and finally decomposed in the usual manner. After filtering off the inorganic salts, the filtrate is dried over anhydrous sodium carbonate, evaporated in vacuo; the residue is dissolved in a 1:1 mixture of ethyl acetate-benzene and chromatographed on a 14 x 2.2 cm. column of basic alumina, activtiy I. The eluate is taken down to dryness; the residual oil dissolved in absolute alcohol, saturated with ethanolic hydrogen chloride, and once again evaporated to dryness. Upon crystallization of the residue from acetone, 3-(cyclopropylmethyl)-1,2,3,4,8,9-hexahydropyrido[4',3' : 2,3]indolo[1,7 - ab][1]benzazepine hydrochloride (XIV) M.P. 267°, is obtained.

EXAMPLES 8–13

In a like manner as in Example 7, Method II, but using in place of cyclopropanecarbonyl chloride an equimolar amount of cyclobutanecarbonyl chloride,
cyclopentanecarbonyl chloride,
cyclohexanecarbonyl chloride,
exo-7-norcaranecarbonyl chloride,
1-adamantanecarbonyl chloride, and
2-cyclohexene-1-carbonyl chloride, respectively, the following products are obtained:

(XV) 3 - (cyclobutylmethyl) - 1,2,3,4,8,9 - hexahydropyrido[4',3':2,3]indolo[1,7 - ab][1]benzazepine hydrochloride, M.P. 256–258° after recrystallization from acetone;

(XVI) 3 - (cyclopentylmethyl) - 1,2,3,4,8,9 - hexahydropyrido[4',3':2,3]indolo[1,7-ab][1]benzazepine hydrochloride, M.P. 227–229° after trituration with acetone;

(XVII) 3 - (cyclohexylmethyl) - 1,2,3,4,8,9 - hexahydropyrido[4',3':2,3]indolo[1,7-ab][1]benzazepine hydrochloride, M.P. 227° after trituration with acetone, drying in a vacuum oven to a vitreous solid, powdering the latter, and repeating the cycle of redrying and repowdering;

(XVIII) 3-(exo-7-norcarylmethyl) - 1,2,3,4,8,9 - hexahydropyrido[4',3':2,3]indolo[1,7-ab][1]benzazepine hydrochloride, as the monoacetonate, M.P. 189–192° (dec.) after recrystallization from acetone;

(XIX) 3 - (1-adamantylmethyl) - 1,2,3,4,8,9 - hexahydropyrido[4',3':2,3]indolo[1,7-ab][1]benzazepine hydrochloride, M.P. 278° after recrystallization from ethanol; and (XX) 3-[(2-cyclohexen-1-yl)methyl] - 1,2,3,4,8,9 - hexahydropyrido[4',3':2,3]indolo[1,7 - ab][1]benzazepine hydrochloride, M.P. 198–200° after recrystallization from acetone.

EXAMPLE 4

1,2,3,4,8,9 - hexahydro - 3 - [(trans - 2 - methylcyclopropyl)methyl]pyrido[4',3':2,3]indolo[1,7 - ab][1]benzazepine hydrochloride [salt of Formula 4; R=(trans - 2 - methylcyclopropyl)methyl; X=X'=Y=Y'=H)]

Similarly, as in Example 7, Method II, but using in place of the cyclopropanecarbonyl chloride an equimolar amount of a mixture of cis- and trans- 2-methylcyclopropanecarbonyl chloride, a yellow gum, consisting of a mixture of amides is obtained. Without separation or purification, this mixture is reduced with lithium aluminum hydride in tetrahydrofuran; and the free base, dissolved in benzene, is chromatographed on a 21 x 2.4 cm. column of neutral alumina, activity I. On evaporation of the eluate, a pale yellow oil is obtained, which is dissolved in ether and treated with ethereal hydrogen chloride. The resulting salt is dried to give the title compound (XXI), M.P. about 250° (dec.). TLC (8% diethylamine/benzene) shows that this product moves as a single spot; the cis-isomer of the precursor is apparently reductively cleaved back to the starting material (I) during the lithium aluminum hydride reduction.

EXAMPLE 15

1,2,3,4,8,9 - hexahydro - 3 - [(1 - methylcyclopropyl) methyl]pyrido[4',3':2,3]indolo[1,7 - ab][1]benzazepine hydrochloride (salt of Formula 4; R=(1-methylcyclopropyl)methyl; X=X'=Y=Y'=H)

Starting with 1-methylcyclopropanecarbonyl chloride and following the procedure of Example 7, Method II, 1,2,3,4,8,9 - hexahydro - 3 - [(1-methylcyclopropyl)carbonyl]pyrido[4',3':2,3]indolo[1,7 - ab][1]benzazepine is obtained as a dark oil, which gradually solidifies (XXII). Without further purification, a solution of 5.6 g. of this solid in 50 ml. benzene is added to a solution of 7 ml. of Vitride® [70% solution of sodium bis(2 - methoxyethoxy)aluminum hydride, $NaAlH_2(OCH_2CH_2OCH_3)_2$, in benzene] in 50 ml. benzene, and after the initial exothermic reaction has subsided, the mixture is heated, under nitrogen, to reflux for 75 minutes. It is then cooled, decomposed with water; the inorganic precipitates are filtered off; and the benzene solution is washed with water and dried over anhydrous potassium carbonate. It is then filtered through a column of basic alumina, activity I. On evaporation of the eluate, a pale yellow oil is obtained, which is dissolved in ether and treated with ethereal hydrogen chloride to give the title compound (XXIII) which, after drying at 100° and 0.3 mm. pressure melts at 172–177°.

EXAMPLE 16

5,12 - dichloro - 1,2,3,4,8,9 - hexahydro - 3, - methylpyrido[4',3':2,3]indolo[1,7 - ab][1]benzazepine
($R=CH_3$; $X=Y'=Cl$; $X'=Y=H$)

A solution of 3.33 g. of sodium nitrite in 10 ml. water is added to a solution of 6.2 g. of 3,7 - dichloro - 10,11-dihydro - 5H - dibenz[b,f]azepine in 70 ml. acetic acid at such a rate as to keep the reaction temperature below 18°. On completion of this addition, 50 ml. of water is added, and the mixture is allowed to stand for a few hours. The resulting solid is then filtered off to give 3,7-dichloro - 10,11 - dihydro - 5 - nitroso - 5H - dibenz[b,f] azepine (XXIV), M.P. 128–131°.

By the procedure of Example 5, the crude title compound is obtained, which on crystallization from ethanol melts at 153–156°. One further recrystallization from isopropyl alcohol yields 5,12 - dichloro - 1,2,3,4,8,9 - hexahydro - 3 - methylpyrido[4',3':2,3]indolo[1,7 - ab][1] benzazepine (XXV), M.P. 155.5–157°.

EXAMPLE 17

1,2,3,4,8,9 - hexahydro - 3,5,12 - trimethylpyrido[4',3':2,3]indolo[1,7 - ab][1]benzazepine hydrochloride (salt of Formula 4; $R=CH_3$; $X=Y'=CH_3$; $X'=Y=H$)

To a solution of 10,11 - dihydro - 3,7 - dimethyl - 5H-dibenz[b,f]azepine in 80 ml. dimethylformamide containing 2.3 g. of sodium nitrite in an ice-water bath, 35 ml. of 2 N hydrochloric acid is added dropwise, with stirring, at a rate such that the reaction temperature is kept between 0° and 5°. Stirring is continued for another half hour, and the reaction mixture is diluted with 100 ml. water. The product formed is filtered off to give 10,11 - dihydro - 3,7 - dimethyl - 5 - nitroso - 5H - dibenz[b,f]azepine (XXVI), M.P. 123–125°.

Using this nitroso compound in the process of Example 5, the title compound (XXVII), M.P. 265–268° (dec.) is obtained.

EXAMPLE 18

3 - (1 - cyclopropylethyl) - 1,2,3,4,8,9 - hexahydropyrido-[4',3':2,3]indolo[1,7-ab][1]benzazepine hydrochloride ($R=1$-cyclopropylethyl; $X=X'=Y=Y'=H$)

Method I.—To a solution of 5.5 g. of (I), 3.4 g. of cyclopropyl methyl ketone and 0.4 g. of methanesulfonic acid in 50 ml. methanol, containing 5 g. of Linde 3A molecular sieve, 1.24 g. of $NaBH_3CN$ is added, and the mixture is allowed to stand at room temperature for 3 days. At the end of that time, it is filtered; the filtrate is acidified to pH 1 with dilute sulfuric acid to decompose excess reagent, basified with aqueous sodium hydroxide, and diluted with approximately 75 ml. water. The resulting basic solution is extracted with chloroform, and the latter is evaporated off to leave a heavy, dark oil, which is taken up in 25 ml. benzene and chromatographed on a 20 x 2.2 cm. column of neutral alumina, activity I. The column is eluted, first with 250 ml. benzene, then with 250 ml. of benzene-ethyl acetate 9:1, and finally with 250 ml. benzene-ethyl acetate 8:2. Since by TLC (8% diethylamine/benzene) the last fraction is contaminated with unchanged (I), only the first two fractions are worked up. Each solution is evaporated; the combined residual yellow oils are dissolved in ether; and an ethereal solution of hydrogen chloride is added to the solution. The resulting precipitate is recrystallized by dissolving it in acetone and adding ether to the solution to the point of turbidity. On standing, the title compound (XXVIII) precipitates as a crystalline white salt, M.P. 259–260°.

Method II.—A mixture of 5.5 g. of (I), 2.3 g. of (1-chloroethyl)cyclopropane and 3.0 g. of sodium bicarbonate in 100 ml. dimethylformamide is heated overnight at 70° with continuous stirring, after which the reaction mixture is poured into water and extracted with ether. The extract is dried, the ether evaporated off, the residue dissolved in benzene and chromatographed, as in Method I, above. The eluate is evaporated to dryness, the residue dissolved in absolute alcohol, treated with alcoholic hydrogen chloride, and stripped down to dryness. The glassy residue is triturated with acetone to yield while crystals, M.P. 253–255°, identical with (XXVIII) by TLC (8% diethylamine/benzene).

EXAMPLE 19

1,2,3,4,8,9 - hexahydro - 3 - (tetrahydrofurfuryl)pyrido-[4',3':2,3]indolo[1,7-ab][1]benzazepine hydrochloride (salt of Formula 4; R=tetrahydrofurfuryl,
$X=X'=Y=Y'=H$)

By a procedure similar to that of Example 18, Method II, but using 3.6 g. of 2-(bromomethyl)tetrahydrofuran in place of the (1-chloroethyl)cyclopropane, and heating to mild reflux for 105 minutes, an oily product is obtained, which on trituration with ethanol-ether yields a crystalline product, M.P. 213–217°. On recrystallization from ethanol-ether, followed by drying for five hours at 100°, the title compound (XXIX) M.P. 215–218°, is obtained.

EXAMPLE 20

3 - cyclopropyl - 1,2,3,4,8,9 - hexahydropyrido[4',3':2,3] indolo[1,7-ab][1]benzazepine hydrochloride (salt of Formula 4; R=cyclopropyl; $X=X'=Y=Y'=H$)

Method I.—A mixture of 28.5 g. of cyclopropylamine and 100 g. of ethyl acrylate is stirred at room temperature for 20 hours, and from the reaction mixture diethyl 3,3'-(cyclopropylimino)dipropionate is distilled, B.P. 122–124°. A solution of 21.3 g. of this diester in 30 ml. benzene is added dropwise to a cooled suspension of 8.0 g. of sodium hydride in a mixture of 150 ml. benzene with 5 ml. ethanol. Soon an exothermic reaction starts, which at first requires occasional cooling; after heat evolution subsides, the reaction mixture is allowed to stand at room temperature overnight. The next morning it is heated on a steam bath for one hour, cooled, and decomposed with 20 g. acetic acid and 13.5 g. water. After filtering off the solids, the benzene solution is washed with aqueous bicarbonate, dried over anhydrous sodium sulfate, and stripped to dryness. On cooling the oily product in the refrigerator for three days and triturating with hexane, crystalline ethyl 1-cyclopropyl-4-oxo-3-piperidine-carboxylate is obtained. After refluxing 17.8 g. of this ester in 90 ml. of 6 N hydrochloric acid for one hour, and taking the resulting solution down to dryness, the solid residue is triturated with hot isopropyl alcohol to yield 1-cyclopropyl-4-piperidone hydrochloride (XXX), M.P. 209–210°.

A mixture of 2.5 g. of N-aminoiminodibenzyl hydrochloride and 2.1 g. of the above piperidone (XXX) in 25 ml. ethanol is heated on the steam bath for 15 minutes and cooled; a solution of 2 g. of concentrated sulfuric acid in 25 ml. of ethanol is added. An exothermic reaction takes place, after which the reaction mixture is heated for 10 more minutes on a steam bath, and poured into water. The resulting turbid suspension is basified with aqueous ammonia, and the resulting solid is taken up in ether. After further extractions with ether, the combined extracts are dried; the solvent is evaporated; and the residue is dissolved in ethanol and treated with ethanolic hydrogen chloride. The solvent is once again evaporated, and the remaining salt is crystallized from ethyl acetate-ether, and recrystallized from acetone-ether, to yield the title compound (XXXI), M.P. 218–220°.

Method II.—Reaction of N-nitrosoiminodibenzyl with (XXX) by the method of Example 2 yields 3-cyclopropyl-1,2,3,4,8,9 - hexahydropyrido[4′,3′:2,3]indolo[1,7-ab][1] benzazepine hydrochloride, M.P. 205°, identical with (XXXI) by TLC (three systems: 8% diethylamine/benzene; chloroform-isopropyl alcohol-diethylamine-7:3:0.2; benzene-ethyl acetate-2:1).

EXAMPLE 21

3 - allyl - 1,2,3,4,8,9 - hexahydropyrido[4′,3′:2,3]indolo-[1,7-ab][1]benzazepine (R=alyll; X=X′=Y=Y′=H)

A mixture of 3.3 g. of (I), 1.45 g. of freshly distilled 3-bromopropene and 1.7 g. of sodium bicarbonate is stirred at room temperature, for 24 hours, in 50 ml. dimethylformamide. At the end of this period, the mixture is poured into water, extracted with ether, and the combined extracts are dried and stripped down. The residue is dissolved in benzene, and the resulting solution chromatographed through a column of neutral alumina. The oily residue obtained on stripping down the eluate is recrystallized from isopropyl alcohol to yield the title compound (XXXII), M.P. 112–113°.

EXAMPLES 22–25

By a similar procedure to that used in Example 21, but using instead of 3-bromopropene an equivalent amount of 3-chloro-2-methylpropene, trans-1-chloro-2-butene, 1-chloro-3-methyl-2-butene, and 3-bromopropyne, respectively, the following products are obtained:

(XXXIII) 1,2,3,4,8,9-hexahydro-3-(2-methylallyl)pyrido[4′,3′:2,3]indolo[1,7 - ab][1]benzazepine hydrochloride, M.P. 235–237° after recrystallization from isopropanol-ether;

(XXXIV) 3 - trans-2-butenyl)-1,2,3,4,8,9-hexahydropyrido[4′,3′:2,3]indolo[1,7-ab][1]benzazepine hydrochloride, M.P. 140–143°;

(XXXV) 1,2,3,4,8,9 - hexahydro-3-(3-methyl-2-butenyl) pyrido[4′,3′:2,3]indolo[1,7 - ab][1]benzazepine hydrochloride, M.P. 143–146°; and (XXXVI) 1,2,3,4,8,9-hexahydro-3-(2 - propynyl)pyrido[4′,3′:2,3]indolo[1,7 - ab][1]benzazepine hydrochloride, M.P. 145–148° after trituration of the crude product with ethanol-ether followed by vacuum drying at 100° for five hours.

EXAMPLE 26

3-benzyl - 1,2,3,4,8,9 - hexahydropyrido[4′,2′:2,3]indolo-[1,7-ab][1]benzazepine hydrochloride (salt of Formula 4; R=benzyl; X=X′=Y=Y′=H)

Following the procedure of Example 2, but using instead of 1-acetyl-4-piperidone an equivalent amount of 1-benzyl-4-piperidone, a crude product is obtained, which is dissolved in ethanol. This solution is saturated with ethanolic hydrogen chloride, and the solvent is stripped off. On trituration of the residue with ethyl acetate, the title compound (XXXVII) is obtained as an off-white solid, M.P. 200°.

EXAMPLE 27

3 - (2-butynyl)-1,2,3,4,8,9-hexahydropyrido[4′,3′:2,3]indolo[1,7-ab][1]benzazepine hydrochloride (salt of Formula 4; R=2-butynyl; X=X′=Y=Y′=H)

A mixture of 42.9 g. of 4-piperidone ethylene acetal (1,4-dioxa-8-azaspiro[4.5]decane) [Stach et al., Monatsh. 93, 1090 (1962)], 37.5 g. of 1,3-dichloro-2-butene and 45 g. of anhydrous potassium carbonate is refluxed for 18 hours, with continuous stirring, in 300 ml. of methyl ethyl ketone. The resulting mixture is cooled and filtered; the filtrate is evaporated to dryness to yield an orange oil, which is taken up in 450 ml. ether; the ethereal layer is washed with water, dried over anhydrous potassium carbonate, and evaporated. The residual light orange oil is distilled at reduced pressure to yield 8-(3-chloro - 2 - butenyl) - 1,4 - dioxa - 8-azaspiro[4.5]decane (XXXVIII) as a clear, colorless liquid, B.P. 94–96°/0.25 mm. After stirring a mixture of 16.3 g. of XXXVIII and 18 g. of powdered potassium hydroxide in 50 ml. of diethylene glycol on a steam bath for two hours, heating with stirring is continued for additional 75 minutes under an atmosphere of nitrogen, in an oil bath, at 165–170°. The mixture is cooled down, treated with 50 ml. water, and extracted three times with 75 ml. portions of chloroform. The combined chloroform extracts are washed twice with water, dried over anhydrous potassium carbonate, and evaporated under vacuum. On distillation of the residual oil under reduced pressure, followed by redistillation under the same conditions, 8-[2-butynyl)-1,4-dioxa - 8 - azaspiro[4.5]decane (XXXIX) is obtained as a colorless oil, B.P. 89–95°/0.10 mm. Refluxing 7.3 g. of this acetylenic acetal (XXXIX) in 50 ml. of 4 N hydrochloric acid for three hours, followed by basification with concentrated aqueous ammonia, extraction with three portions of chloroform, washing of the chloroform extracts with water, and drying them over anhydrous sodium sulfate, yields, on evaporation of the solvent, the hydrolysis product 1-(2-butynyl)-4-piperidone (XL), as a yellow oil, which distills at 67.5–69°/0.20 mm.

By the procedure of Example 2, using instead of 1-acetyl-4-piperidone an equimolar amount of 1-(2-butynyl)-4-piperidone (XL), a gum is obtained which in this case is extracted with chloroform instead of with ethyl acetate. The combined chloroform extracts are dried over anhydrous potassium carbonate and evaporated to dryness; the residue is taken up in benzene and chromatographed on a 20 x 2.2 cm. column of neutral alumina, activity I. The benzene eluate is taken down to dryness; the residue is dissolved in anhydrous ether and treated with ethereal hydrogen chloride. The resulting precipitate is filtered, and recrystallized from acetone. After standing overnight at —20° the title compound (XLI) is obtained as a microcrystalline white solid, which, after drying at 100°/0.5 mm. for four hours, starts to sinter at about 170°, and then melts at 173–175° with decomposition.

EXAMPLE 28

1-(1,2,3,4,8,9-hexahydropyrido[4′,3′:2,3]indolo[1,7 - ab] [1]benzazepin-3-yl)-2-propanone hydrochloride (salt of Formula 4; R=acetonyl; X=X′=Y=Y′=H)

To a solution of 11 g. of I in 200 ml. dimethylformamide 6 g. of sodium bicarbonate and 4.1 g. of chloroacetone are added, and the mixture is stirred at room temperature for three hours, then heated on a steam bath for additional 40 minutes to drive the reaction to completion. The reaction mixture is then poured into water; the water is extracted with ether; the ether is dried and evaporated off, and the residue is eluted through a basic alumina column with benzene-acetone (3:1). The eluate is evaporated to dryness, and the residual oil is dissolved in ethanol; the ethanolic solution is treated with ethanolic hydrogen chloride, and again the solvent is evaporated off. On digestion with acetone, the solid residue yields the title compound (XLII), M.P. 257°.

EXAMPLE 29

N-ethyl-1,2,3,4,8,9-hexahydropyrido[4′,3′2:3]indolo[1,7-ab][1]benzazepine - 3 - carboxamide(R=N—ethylcarbamoyl; X=X′=Y=Y′=H)

Addition of 1.2 g. of ethyl isocyanate to a solution of 3.5 g. of I in 150 ml. dichloromethane results in a mildly exothermic reaction. After stirring the reaction mixture for ten minutes, the solvent is removed on a rotary evaporator at 35° and water pump pressure. The resulting residue is recrystallized from acetone-benzene (4:1) to yield the title compound (XLIII), M.P. 202–206°.

The analgesic activity of these indolobenzazepine derivatives is conveniently determined in a Phenylquinone Writhing test (PQW test), as described below:

Phenylquinone Writhing.—(Results given in mg./kg. per os/mouse).

Groups of at least 10 mice are given phenyl-p-benzoquinone 2.5 mg./kg. intraperitoneally 30 minutes after oral administration of graded doses of the test substance. Two or more dose levels are used for each compound. For scoring purposes, a "writhe" is defined as stretching, twisting of a hindleg inward, or contraction of the abdomen. The total number of writhes for each animal, treated and control animals side-by-side, are counted over a 30-minute time interval. An $ED_{50}$, calculated on basis of the percentage of animals at each dose level which showed 50% or less of the average number of writhes of the control animals, is reported for each compound submitted to this screening test. The PQW test is widely used as an indicator of potential analgesic activity in man, especially for non-narcotic substances.

The results obtained with the compounds described in the preceding examples are presented in the table below, in which codeine and aspirin are used as the standard analgesics for comparison.

general central nervous system depressant activity. However, because of its high analgesic activity, Compound XXXVI can be expected to be a useful analgesic at such low dosages that the general central nervous system depressant activity would be negligible. Compounds II, III, XIII, XIX, XXVII, XXXI, XXXVI, XXXVII, XLII, and XLIII constitute the preferred group of analgesics of the present invention.

The free amines of Formula 4 and some of their pharmaceutically acceptable inorganic or organic acid addition salts are substantially insoluble in water. They are best administered orally at a level of about 1 to about 100 milligrams per kilogram of body weight of the animal. Some addition salts of the compounds having Formula 4 are more water-soluble and can be administered by subcutaneous or intramuscular injection. The dosage employed in such cases generally would be within the range of 0.3 to about 50 milligrams per kilogram of body weight.

The compounds of the present invention can be formulated into compositions comprising a compound of Formula 4 or a pharmaceutically acceptable acid addition salt thereof together with a pharmaceutically acceptable carrier. The carrier may be either a solid or liquid, and the compositions can be in form of tablets, liquid-filled capsules, dry filled capsules, aqueous solutions, non aqueous solutions, suppositories, syrups, suspensions, and the like. The compositions can, and in many cases do contain suitable preservatives, coloring and flavoring agents. Some examples of the carriers which can be used in the preparation of the products of the invention are

TABLE.—PQW TEST OF COMPOUNDS OF FORMULA (4) IN THE MOUSE

| Compound | R | Salt [1] | X, X', Y, and Y' when other than hydrogen | $ED_{50}$ in mg./kg. |
|---|---|---|---|---|
| II | Hydrogen | Mes | | 3.9 |
| III | do | HCl | | 8.1 |
| V | Ethoxycarbonyl | | | 62 |
| VII | Isobutyl | HCl | | 7.0 |
| VIII | Methyl | HCl | | 4.6 |
| IX | Ethyl | HCl | | 7.1 |
| XII | Cyclopropylmethyl | Mes | | 8.4 |
| XIII | Cyclopropylcarbonyl | | | 20 |
| XV | Cyclobutylmethyl | HCl | | 7.8 |
| XVI | Cyclopentylmethyl | HCl | | 5.3 |
| XVII | Cyclohexylmethyl | HCl | | 22 |
| XVIII | Exo-7-norcarylmethyl | HCl | | 5.6 |
| XIX | 1-adamantylmethyl | HCl | | 31 |
| XX | (2-cyclohexen-1-yl)methyl | HCl | | 3.1 |
| XXI | (Trans-2-methylcyclopropyl)methyl | HCl | | 3.0 |
| XXIII | (1-methylcyclopropyl)methyl | HCl | | 3.5 |
| XXV | Methyl | | X=Y'=Cl | 34 |
| XXVII | do | | X=Y'=CH$_3$ | 11.8 |
| XXVIII | 1-(cyclopropyl)ethyl | HCl | | 16.8 |
| XXIX | Tetrahydrofurfuryl | HCl | | 4.7 |
| XXXI | Cyclopropyl | | | 19 |
| XXXII | Allyl | | | 22 |
| XXXIII | 2-methylallyl | HCl | | 7.1 |
| XXXIV | Trans-2-butenyl | HCl | | 8.4 |
| XXXV | 3-methyl-2-butenyl | HCl | | 6.3 |
| XXXVI | 2-propynyl | HCl | | 1.25 |
| XXXVII | Benzyl | HCl | | 6.0 |
| XLI | 2-butynyl | HCl | | 7.7 |
| XLII | Acetonyl | HCl | | 8.9 |
| XLIII | N-ethylcarbamoyl | | | 8.6 |
| Standard | Codeine | Phos | | 19 |
| Standard | Aspirin | | | 94 |

[1] HCl=hydrochloride; Mes=mesylate (methanesulfonate); Phos=phosphate.

Although many compounds show analgesia in various tests, they often also show other actions of general central nervous system depression, such as sedation or muscular weakness. Such side effects are usually undesirable and sometimes prohibitive. A good analgesic should preferentially depress pain, with a minimum of the other general depressant actions. Compound III, above—1,2,3,4,8,9-hexahydropyrido[4',3':2,3]indolo[1,7-ab][1]benzazepine hydrochloride—appears to be in this category, showing evidence of effective analgesic action in animal tests but showing very little indication of the other types of general central nervous system depression or side effects. A similar type of activity is observed in tests employing Compounds II, XIII, XIX, XXVII, XXXI, XXXVII, XLII, and XLIII. The most potent compound in these tests was Compound XXXVI, but it also exhibited gelatin capsules, sugars such as lactose and sucrose, starches, dextrans and cellulosics, such as methyl cellulose and cellulose acetate phthalate, gelatin; talc; stearic acid salts; vegetable oils such as peanut oil, cottonseed oil, sesame oil, olive oil, corn oil and oil of theobroma; liquid petrolatum; polyethylene glycol; glycerine; sorbitol; propylene glycol; ethanol; agar; water and isotonic saline.

In preparing the compositions of the invention for pharmaceutical uses, the conventional practices and precautions are used. The composition intended for parenteral administration must be sterile, and this can be accomplished either by using sterile ingredients and carrying out the production under aseptic conditions, or by sterilizing the final composition by one of the usual procedures such as autoclaving under appropriate temperature and pressure conditions. Customary care should be exercised that no incompatible conditions exist between the active components and the diluent preservative or flavoring agent or in the conditions employed in preparation of the compositions.

The compositions of the invention can be introduced into warm-blooded animals by the oral, rectal or parenteral route. This can be done by swallowing, in the case of liquid or solid preparations; by suppositories; or by injecting the liquid preparations intravenously, intramuscularly, intraperitoneally, or subcutaneously.

Typical formulations of the type listed above which may be used for the administration of these compounds are:

EXAMPLE A

| Ingredients: | Mg./tablet |
|---|---|
| 1,2,3,4,8,9 - hexahydropyrido[4',3':2,3]indolo-[1,7-ab][1]benzazepine hydrochloride | 15 |
| Lactose, USP | 183 |
| Magnesium stearate, USP | 2 |
| Color (if desired), q.s. | |

All of the above ingredients are passed through a suitable sieve, blended for 20 minutes, and compressed directly into tablets of 200 mg. on a suitable table press using a $11/32''$ punch and die.

EXAMPLE B

| Ingredients: | Mg./tablet |
|---|---|
| 3-benzyl - 1,2,3,4,8,9 - hexahydropyrido[4',3':2,3]indolo[1,7 - ab][1]benzazepine hydrochloride | 50 |
| Lactose, USP | 215 |
| Methylcellulose, USP | 15 |
| Talc, USP | 6 |
| Starch, USP | 10 |
| Magnesium stearate, USP | 4 |
| Color (if desired), q.s. | |

The lactose and active ingredient are wet granulated with a solution of methylcellulose in a blender until a satisfactory mass is achieved. The mass is dried and classified through an appropriate sieve. The remaining ingredients are passed through an 80 mesh sieve and blended with the dried granulated material. The blend is then compressed into tablets on a suitable tablet press at a weight of 300 mg. using a ⅜" punch and die.

EXAMPLE C

| Ingredients: | Mg./capsule |
|---|---|
| 3-cyclopropyl - 1,2,3,4,8,9 - hexahydro - 3 - (2-methylallyl)pyrido[4',3':2,3]indolo[1,7 - ab][1]benzazepine hydrochloride | 25 |
| Lactose, USP | 100 |
| Magnesium stearate, USP | 1 |
| Colloidal silicon dioxide, N.F. | 2 |

The combined ingredients are blended and passed through a 40 mesh sieve, and the mixture is encapsulated into a two-piece hard gelatin No. 3 capsule on a suitable encapsulating machine at a net weight of 128 mg.

EXAMPLE D

| Ingredients: | Gram/liter |
|---|---|
| 1,2,3,4,8,9-hexahydro-3-(2 - methylallyl)pyrido[4',3':2,3]indolo - [1,7 - ab][1]benzazepine methanesulfonate | 3 |
| Granulates sugar | 600 |
| Sodium benzoate | 1 |
| Flavor, q.s. | |
| Color, q.s. | |
| Deionized water, q.s. | |

All of the above ingredients are dissolved in water and made up to a volume of one liter.

EXAMPLE E

| Ingredients: | Gram/liter |
|---|---|
| 1,2,3,4,8,9 - hexahydropyrido[4',3':2,3]indolo-[1,7-ab][1]benzazepine hydrochloride | 10 |
| Propylparaben, USP | 0.2 |
| Methylparaben, USP | 1.8 |
| Water for injection, q.s. to 1 liter. | |

Dissolve the parabens in about 800 ml. of water for injection at 80°. Cool to room temperature, add the active ingredient, and stir to dissolve. If the solution is aseptically prepared, sterile filtration through a millipore filter or other suitable retentive filter is desirable. Terminal sterilization by autoclaving may also be employed to render the product sterile.

EXAMPLE F

| Ingredients: | Gram/liter |
|---|---|
| 3-methyl - 1,2,3,4,8,9 - hexahydropyrido[4',3':2,3]indolo[1,7 - ab][1]benzazepine hydrochloride | 10 |
| Propylparaben, USP | 0.2 |
| Methylparaben, USP | 1.8 |
| Sodium carboxymethylcellulose, USP (CMC) | 5 |
| Polysorbate 80, USP | 1 |
| Water for injection, q.s. to 1 liter. | |

The parabens, CMC and one-half of the polysorbate 80 are dissolved in about 700 ml. of water for injection, with agitation at 80° (solution A). A slurry is made of the active ingredient, one-half of the polysorbate 80 and about 200 ml. of water for injection (slurry B). Solution A is aseptically filtered through a millipore filter to render it sterile, while slurry B is autoclaved for 30 minutes at 15 lbs. steam pressure to make it sterile. A and B are aseptically combined, brought to correct volume with sterile water for injection, and mixed to homogeneity.

I claim:

1. A method of producing an analgesic effect in a warm-blooded animal in pain, said method comprising administering to said animal an effective amount of a compound selected from (1) a base having the following formula

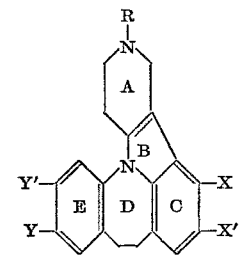

wherein
R is hydrogen;
a $C_1$–$C_{12}$ aliphatic hydrocarbon radical; benzyl;
a $C_nH_{(2n-1)}Z$ group, wherein $n$ is a positive integer of 3–6;

a $-\overset{O}{\underset{\|}{C}}-R'$ group;

a $-\overset{O}{\underset{\|}{C}}-O-R°$ group; or a $-CH_2-\overset{O}{\underset{\|}{C}}-R''$ group; wherein Z is oxygen or sulfur; R' is a $C_2$–$C_{11}$ hydrocarbon radical, a $C_mH_{(2m-1)}Z$ group wherein $m$ is a positive integer of 2–5, or an $-NR_1R_2$ group wherein each of $R_1$ and $R_2$ independently is hydrogen or a $C_1$–$C_4$ alkyl; R° is a $C_1$–$C_4$ alkyl; R'' is a $C_1$–$C_4$ alkyl; and X, X', Y, and Y' individually are hydrogen, fluorine, chlorine, bromine, trifluoromethyl, a $C_1$–$C_4$ alkyl, or a $C_1$–$C_4$ alkoxyl; provided that one of X and X' and one of Y and Y' must be hydrogen; and (2) a salt of such base with a pharmaceutically acceptable organic or inorganic acid.

2. The method of claim 1 wherein the compound is administered orally within the range of about 1–100 mg. per kilogram of body weight.

3. The method of claim 1 wherein the compound is administered parenterally within the range of about 0.3 to 50 mg. per kilogram of body weight.

4. A method of claim 1 wherein R in the formula of the compound administered is selected from the group consisting of (1) hydrogen, cyclopropyl, cyclopropylcarbonyl, 1-adamantylmethyl, 2-propynyl, benzyl, acetonyl, and N-ethylcarbamoyl; each of X, X', Y and Y' being hydrogen; and (2) methyl; each of X' and Y being hydrogen; and each of X and Y' being methyl.

5. The method of claim 4 wherein each of R, X, X', Y, and Y' is hydrogen.

6. The method of claim 4 wherein R is cyclopropyl, and each of X, X', Y, and Y' is hydrogen.

7. The method of claim 4 wherein R is cyclopropylcarbonyl, and each of X, X', Y, and Y' is hydrogen.

8. The method of claim 4 wherein R is 1-adamantylmethyl, and each of X, X', Y, and Y' is hydrogen.

9. The method of claim 4 wherein R is 2-propynyl, and each of X, X', Y, and Y' is hydrogen.

10. The method of claim 4 wherein R is benzyl, and each of X, X', Y, and Y' is hydrogen.

11. The method of claim 4 wherein R is acetonyl, and each of X, X', Y, and Y' is hydrogen.

12. The method of claim 4 wherein R is N-ethylcarbamoyl, and each of X, X', Y, and Y' is hydrogen.

13. The method of claim 4, wherein each of R, X, and Y' is methyl, and each of X' and Y is hydrogen.

References Cited

UNITED STATES PATENTS 3,457,271    7/1969    Cohen et al.          424—263

STANLEY J. FRIEDMAN, Primary Examiner